US010884712B1

(12) United States Patent
Koh et al.

(10) Patent No.: US 10,884,712 B1
(45) Date of Patent: Jan. 5, 2021

(54) COMPONENT-BASED FRAMEWORK FOR GENERATING DEVICE DRIVER MODEL ELEMENTS

(71) Applicant: The MathWorks, Inc., Natick, MA (US)

(72) Inventors: David H. Koh, Boston, MA (US); Murat Belge, Westford, MA (US); Zijad Galijasevic, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 818 days.

(21) Appl. No.: 15/058,876

(22) Filed: Mar. 2, 2016

Related U.S. Application Data

(63) Continuation-in-part of application No. 14/264,436, filed on Apr. 29, 2014, now Pat. No. 9,329,840, (Continued)

(51) Int. Cl.
*G06F 9/44* (2018.01)
*G06F 8/35* (2018.01)
(Continued)

(52) U.S. Cl.
CPC .............. *G06F 8/35* (2013.01); *G06F 8/34* (2013.01); *G06F 8/36* (2013.01); *G06F 8/38* (2013.01); *G06F 9/4411* (2013.01)

(58) Field of Classification Search
CPC . H04L 1/0003; G06F 8/34; G06F 8/35; G06F 8/36; G06F 8/38; G06F 9/4411; G05B 17/02
See application file for complete search history.

(56) References Cited

U.S. PATENT DOCUMENTS

| | | |
|---|---|---|
| 4,821,172 A | 4/1989 | Kaneko et al. |
| 5,301,336 A | 4/1994 | Kodosky et al. |
| | (Continued) | |

OTHER PUBLICATIONS

Mathworks, "Stateflow and StateFlow coder", User's Guide, Version 5, copyright 1997-2003—chp. 1-16, 896 pgs <SFCV5.pdf>.*
(Continued)

*Primary Examiner* — Tuan A Vu
(74) *Attorney, Agent, or Firm* — Cesari and McKenna, LLP.; Michael R. Reinemann

(57) ABSTRACT

A device may connect to a physical device. A device may obtain a device description document relating to the physical device based on connecting to the physical device. The device may parse the device description document to identify one or more components of the physical device. The device may select, from a repository of generic textual model components, one or more generic textual model components corresponding to the physical device based on parsing the device description. The device may generate, based on selecting the one or more generic textual model components, a device driver model element that includes the one or more generic textual model components. The device driver model element may be used to control the physical device or receive information from the physical device. The device may provide, via a user interface, information identifying the device driver model element.

25 Claims, 11 Drawing Sheets

Related U.S. Application Data which is a continuation of application No. 11/324,086, filed on Dec. 30, 2005, now abandoned.

(60) Provisional application No. 62/127,435, filed on Mar. 3, 2015.

(51) Int. Cl.
*G06F 8/34* (2018.01)
*G06F 8/36* (2018.01)
*G06F 8/38* (2018.01)
*G06F 9/4401* (2018.01)

(56) References Cited

U.S. PATENT DOCUMENTS

| | | | |
|---|---|---|---|
| 5,313,615 A | 5/1994 | Newman et al. | |
| 5,339,432 A | 8/1994 | Crick | |
| 5,440,740 A | 8/1995 | Chen et al. | |
| 5,613,123 A | 3/1997 | Tsang et al. | |
| 5,781,797 A | 7/1998 | Crick et al. | |
| 6,161,154 A | 12/2000 | Schultz et al. | |
| 6,219,628 B1 | 4/2001 | Kodosky et al. | |
| 6,965,769 B2 | 11/2005 | Bims et al. | |
| 6,965,800 B2 | 11/2005 | Schmit et al. | |
| 6,996,799 B1 | 2/2006 | Cismas et al. | |
| 7,290,244 B2 | 10/2007 | Peck et al. | |
| 7,565,631 B1 | 7/2009 | Banerjee et al. | |
| 2002/0041570 A1* | 4/2002 | Ptasinski | H04L 1/0003 370/252 |
| 2002/0080174 A1 | 6/2002 | Kodosky et al. | |
| 2003/0005179 A1 | 1/2003 | Schmit et al. | |
| 2003/0009099 A1* | 1/2003 | Lett | G05B 17/02 600/416 |
| 2003/0018953 A1 | 1/2003 | Aberg | |
| 2003/0035004 A1* | 2/2003 | Dove | G06F 8/34 715/762 |
| 2003/0074489 A1 | 4/2003 | Steger et al. | |
| 2003/0192032 A1 | 10/2003 | Andrade et al. | |
| 2004/0005859 A1 | 1/2004 | Ghercioiu et al. | |
| 2004/0078180 A1 | 4/2004 | Allen et al. | |
| 2005/0243322 A1 | 11/2005 | Lasker et al. | |
| 2005/0289274 A1 | 12/2005 | Ghercioiu et al. | |
| 2006/0015862 A1 | 1/2006 | Odom et al. | |
| 2006/0026307 A1 | 2/2006 | Bragagnini et al. | |
| 2006/0041860 A1 | 2/2006 | Carmichael et al. | |
| 2007/0088865 A1 | 4/2007 | Breyer | |

OTHER PUBLICATIONS

Texas Instruments, "Overview for Data Converters", Data Converters, http://www.ti.com/lsds/ti/analog/dataconverters/data_converter.page, Sep. 1, 2011, 2 pages.

Analog Devices, Inc., "Device Drivers and System Services Manual for Blackfin Processors", Visual DSP++ 4.0, Revision 1.0, Part No. 82-000430-01, Feb. 2005, 344 pages.

Texas Instruments, "HAL Code Generator tool", (Active) HALCOGEN, TI Software Folder, http://www.ti.com/tool/halcogen#descriptionArea, Sep. 6, 2011, 4 pages.

Wikipedia, "Unified Modeling Language", http://en.wikipedia.org/wiki/Unified_Modeling_Language, Nov. 1, 2008, 9 pages.

Mathworks, "Simulink: Model based and System based Design", Using Simulink, version V5, copyright 1990-2002, 236 pgs <SimulinkV5.pdf>.

Mathworks, "Stateflow and StateFlow coder", User's Guide, Version 5, copyright 1997-2002-chp. 1-15, pp. 1-316 <stateFlowV5.pdf>.

Co-pending U.S. Appl. No. 14/264,436, filed Apr. 29, 2014 entitled "Graphical Programming of Custom Device Drivers", Koh et al, 43 pages.

Abandoned U.S. Appl. No. 11/324,086 by David Koh et al., entitled "Graphical Programming of Custom Device Drivers," filed Dec. 30, 2005, 43 pages.

* cited by examiner

COMPONENT-BASED FRAMEWORK FOR GENERATING DEVICE DRIVER MODEL ELEMENTS

RELATED APPLICATIONS

This application claims priority under 35 U.S.C. § 119 to U.S. Provisional Patent Application No. 62/127,435, filed on Mar. 3, 2015, the content of which is incorporated by reference herein in its entirety.

This application is a continuation in part of U.S. patent application Ser. No. 14/264,436, filed on Apr. 29, 2014, which is a continuation of U.S. patent application Ser. No. 11/324,086 filed Dec. 30, 2005, the entire contents of which are hereby incorporated by reference.

DETAILED DESCRIPTION

The following detailed description of example implementations refers to the accompanying drawings. The same reference numbers in different drawings may identify the same or similar elements.

A system may include a set of physical devices that correspond to portions of the system. For example, a heating system may include a particular physical device (e.g., a temperature control device) that includes a set of sensors (e.g., a temperature sensor or a flow rate sensor). A model may include a set of model elements that, when executed on a computing device, simulate behavior of a system. However, manual generation of model elements to represent portions of the system, such as the particular physical device, may be time-consuming, resource intensive, and error prone. Moreover, device driver model elements may be required to perform functionalities associated with testing and control of the system, but may not be published by a vendor of the physical device. Implementations, described herein, may utilize a component-based framework to generate device driver model elements.

When a device driver model element is generated for a particular physical device, a host device may simulate aspects of the particular physical device, control aspects of the particular physical device, or the like. Moreover, a host device may generate device driver program code associated with permitting other host devices to control and/or simulate aspects of the particular physical device. In this way, the host device reduces utilization of network resources by obviating the need to search for an appropriate device driver model element or device driver code. Moreover, based on utilizing a framework of generic components, selected and/or connected based on a device description associated with the particular physical device, the host device reduces a utilization of computing resources (e.g., processor resources or memory resources) relative to requiring the host device to receive manual user entry of each portion of the device driver model element or device driver code.

Figure 1:
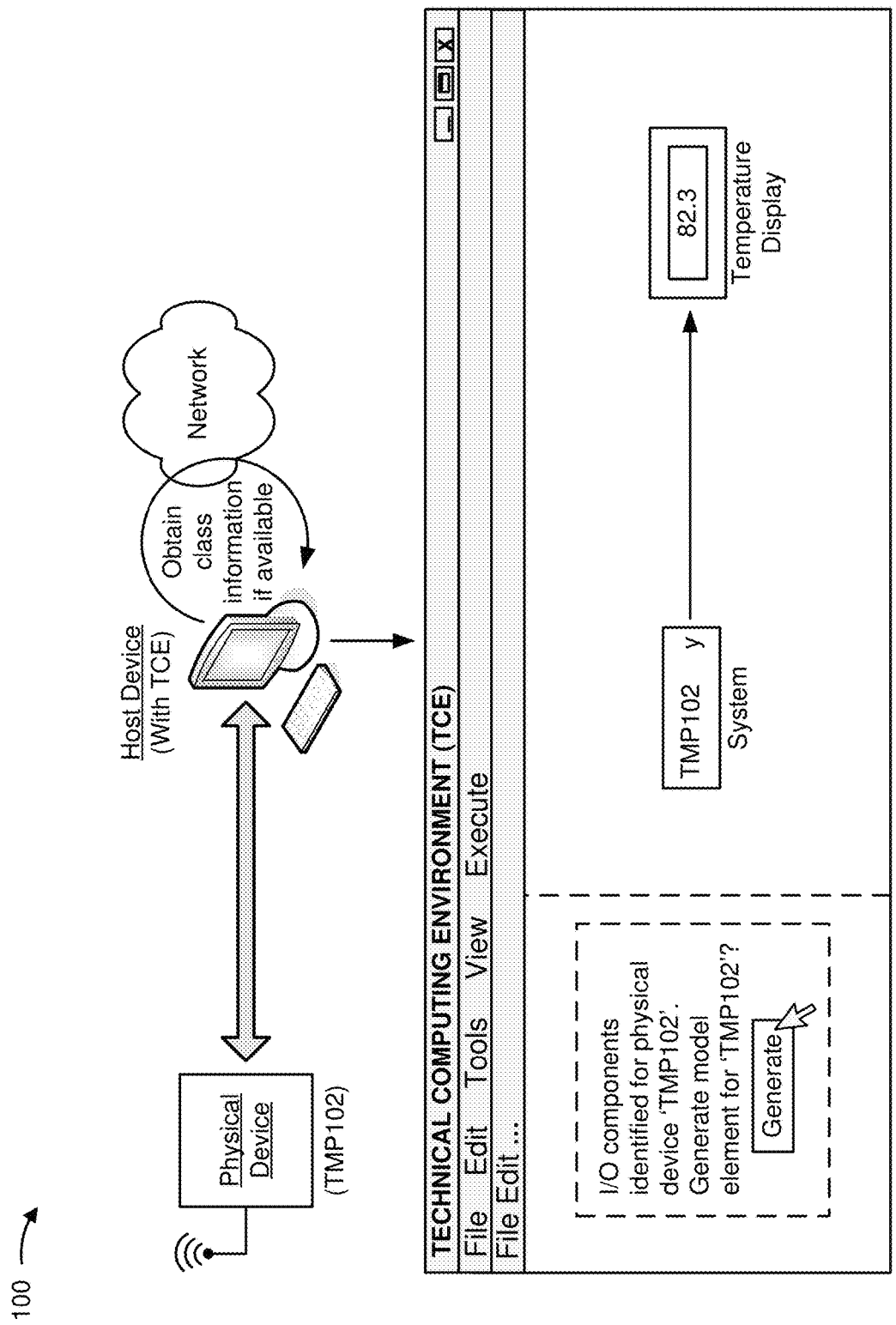
FIG. 1 is a diagram of an overview of an example implementation described herein.

FIG. 1 is a diagram of an overview of an example implementation 100 described herein. As shown in FIG. 1, example implementation 100 may include a physical device, such as a sensor, an actuator, a phone, a mobile device, a camera, or the like, and a host device including a technical computing environment (TCE). The host device may connect to the physical device. For example, the host device may determine that the physical device has moved within communication range of the host device, and may establish a wireless connection to communicate with the physical device. In some implementations, the host device may detect the physical device without the physical device moving within a particular spatial proximity. For example, the host device may detect the physical device via a local area network (LAN), at a particular Internet protocol (IP) address via the Internet, or via another virtual connection. In another example, the host device may generate a model element (e.g., a device driver model element), as described herein, without connecting to the physical device, such as based on detecting a user interaction with a user interface provided via the host device.

With regard to FIG. 1, the host device may determine physical device information associated with the physical device. For example, the host device may identify a device description (e.g., an extensible markup language (XML) file) including information regarding the physical device, such as a set of inputs associated with the physical device, a set of outputs associated with the physical device, a communications protocol utilized by the physical device, or the like. In some implementations, the host device may connect to a network to access the device description. In some implementations, the host device may utilize a natural language processor to analyze a natural language document associated with the physical device (e.g., a device manual), and identify components of the physical device. In some implementations, the host device may provide a user interface with which to receive user interactions associated with providing a device description corresponding to the physical device.

The host device may identify a set of components for inclusion in a device driver model element corresponding to the physical device based on the device description. For example, based on the physical device description, the host device may identify a generic set of input components, output components, or the like stored via a component repository. In this case, the host device may determine that the physical device communicates via a first protocol and a second protocol, and may identify input and output (I/O) components corresponding to the first protocol and the second protocol. In some implementations, the host device may identify a sensor fusion component, an algorithm, or the like for the device driver model element. In some implementations, the host device may identify an operation mode (e.g., a connected mode or a simulation mode) for the device driver model element, and may select one or more components corresponding to the operation mode.

As further shown in FIG. 1, the host device may provide an indication, in the TCE, that I/O components have been identified for the physical device, and may receive a request to generate a model element (e.g., the device driver model element) for the physical device. For example, a user may provide input via a graphical user interface (GUI) of the TCE to indicate a decision to generate the model element for the physical device. The host device may provide the model element for display. For example, the host device may generate a System model element (e.g., corresponding to the physical device) with an output y (e.g., corresponding to an output component of the physical device) that is connected to a temperature display element. In another example, the host device may generate a textual model element (rather than a graphical model element) to represent the physical device, as described herein.

Based on executing a model including the model element, the host device may perform a read operation of data of the physical device to identify a temperature captured by a temperature sensor of the physical device, and may provide an indication of the temperature for display. In another example, the host device may provide simulated values as input to the model element, rather than performing the read operation of the physical device, to provide a simulation mode of operation of the physical device.

In some implementations, the host device may store the model element in a repository for utilization in one or more other models. For example, the host device may identify a device driver model element repository, and may include information identifying the device driver model element to permit a subsequent utilization of the device driver model element. In some implementations, the host device may generate program code for the model element based on a program code framework. For example, the host device may generate a device driver utilizing an operating system (OS) framework, a non-OS (bare-metal) framework, or the like to permit another device to utilize the program code as the device driver to connect to the physical device, simulate operation of the physical device, or the like in an OS environment, a bare-metal environment, or the like.

In this way, the host device generates a textual or graphical device driver model element and/or a device driver for a physical device, thereby permitting communication with and/or control of the physical device. Based on utilizing a component framework of stored I/O components, the host device reduces a utilization of memory and/or processing resources relative to requiring a user to provide input to create new components and/or groups of components or write new program code for the device driver model element and/or the device driver.

As indicated above, FIG. 1 is provided merely as an example. Other examples are possible and may differ from what was described with regard to FIG. 1.

Figure 2:
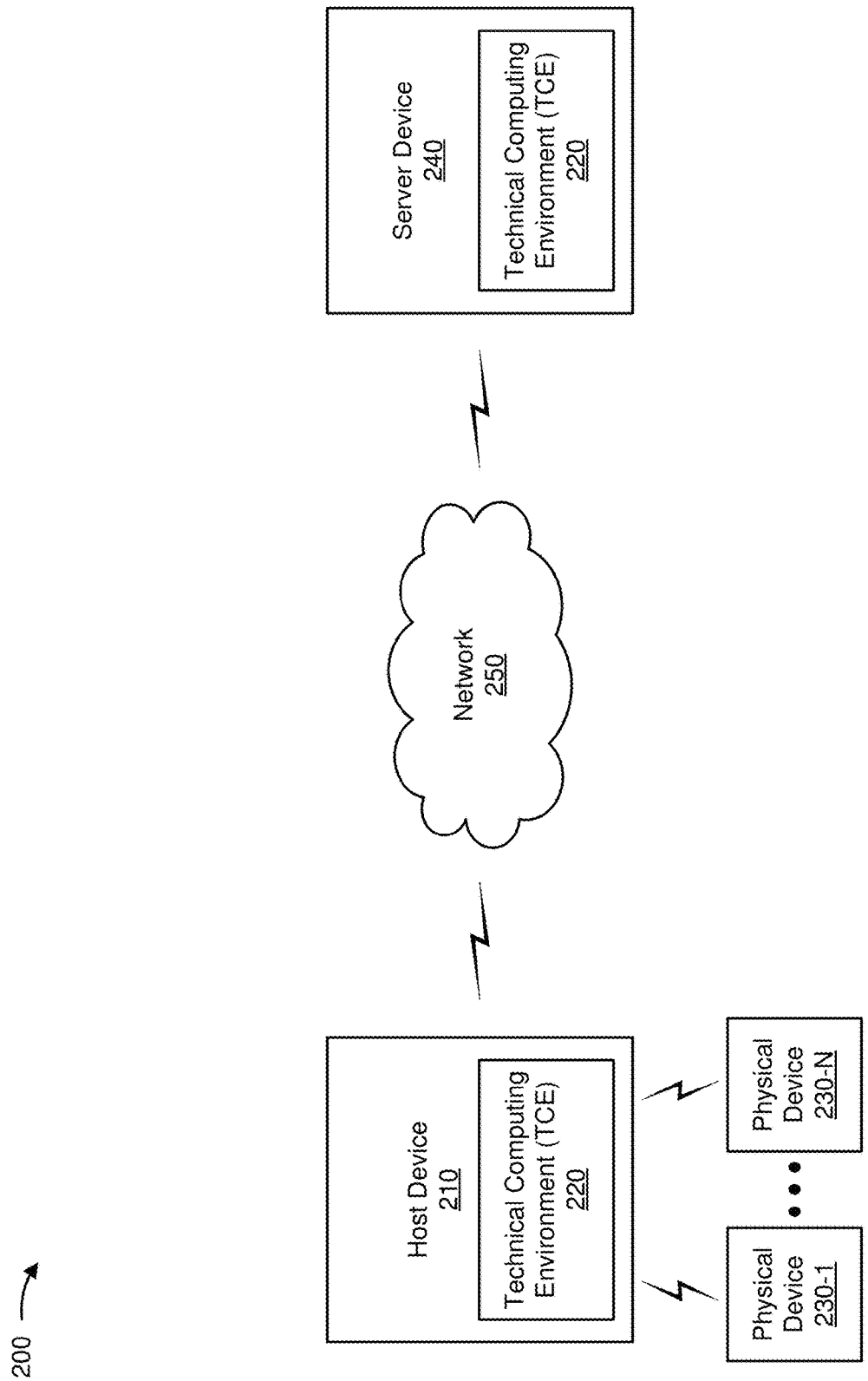
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a host device 210, which may include a technical computing environment (TCE) 220. Furthermore, environment 200 may include a physical device 230-1 through 230-N (N≥1) (hereinafter referred to collectively as "physical devices 230," and individually as "physical device 230"), a server device 240, which may include TCE 220, and a network 250. Devices of environment 200 may interconnect via wired connections, wireless connections, or a combination of wired and wireless connections.

Host device 210 includes one or more devices capable of receiving, generating, storing, processing, and/or providing a model and/or information associated with a model (e.g., a textual model element, a graphical model element, a model component, a block, an input signal, a portion of program code, or the like). For example, host device 210 may include a computing device, such as a host computer, a desktop computer, a laptop computer, a tablet computer, a mobile phone (e.g., a smart phone or a radiotelephone), a mobile device, a server, or a similar device. In some implementations, host device 210 may receive information from and/or transmit information to physical device 230 and/or server device 240.

Host device 210 may host TCE 220. TCE 220 includes any hardware-based component or a combination of hardware and software-based components that provides a computing environment that allows tasks to be performed (e.g., by users) related to disciplines, such as, but not limited to, mathematics, science, engineering, medicine, and business. TCE 220 may be implemented as a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); or Virtuoso from Cadence; Modelica or Dymola from Dassault Systemes) and/or a graphically-based environment (e.g., Simulink® software, Stateflow® software, SimEvents® software, or Simscape™ software, by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; or aspects of a Unified Modeling Language (UML) or SysML environment). In some implementations, TCE 220 may include a hybrid environment that includes one or more of the above-referenced text-based environments and one or more of the above-referenced graphically-based environments. In some implementations, TCE 220 may include, for example, a user interface and/or may enable simulation and execution of hardware and/or software systems. In some implementations, TCE 220 may include a high-level architecture (HLA) that facilitates performing a simulation, such as performing a distributed simulation.

TCE 220 may be integrated with or operate in conjunction with a graphical modeling environment, which may provide graphical tools for constructing models of systems and/or processes. TCE 220 may include additional tools, such as tools designed to convert a model into an alternate representation, such as an alternate model format, code or a portion of code representing source computer code and/or compiled computer code, a hardware description (e.g., a specification of a digital circuit, or a description of a circuit layout), or the like. TCE 220 may also include tools to convert a model into project files for use in an integrated development environment (IDE) such as Eclipse by Eclipse Foundation, IntelliJ IDEA by JetBrains or Visual Studio by Microsoft.

A model may include one or more model elements that simulate characteristics of physical devices, such as physical devices 230. A model element (e.g., a device driver model element) may correspond to physical device 230 and may implement, in the model, data specifications, processing functions, and/or input/output connections that are representative of physical device 230. The model element may be associated with a graphical representation thereof that may include a set of entities, such as a block, a set of blocks (e.g., block diagram blocks), ports, a system, a set of systems, a model reference, a set of models, a set of model elements (e.g., a hierarchically related set of model elements), or the like. In some implementations, the model element may include a textual representation, such as a code line, a code section, a function, a method, a textual program, a script, an object, a method of an object, another textual model, a textual element, a textual block, or the like. A portion of a model element, such as a block, a port, a textual element, or the like may be referred to as a model component for clarity. In some implementations, model elements may include relations (e.g., a connector line or a symbolic reference), attributes (e.g., a sample time, a data type, a dimension, or a physics type) While some implementations are described herein with respect to a model element representing a physical device (e.g., physical device 230), the model element may represent physical device 230 and/or a component, subsystem, etc. associated with a graphical representation of physical device 230. In some implementations, multiple physical devices 230 may be associated with a particular model element. Additionally, or alternatively, multiple model elements may be associated with a single physical device 230. In some implementations, the model may hierarchically include a particular model element, and the particular model element may hierarchically include a set of other model elements.

A model generated with TCE 220 may include, for example, equations (e.g., algebraic equations, differential equations, or difference equations), one or more action languages and/or an action language associated therewith, assignments, constraints, computations, algorithms, functions, methods, communication protocols, process flows, or the like. The model may be implemented as, for example, time-based block diagrams (e.g., via the Simulink® product, available from The MathWorks, Incorporated), discrete-event based diagrams (e.g., via the SimEvents® product, available from The MathWorks, Incorporated), dataflow diagrams, state transition diagram (e.g., via the Stateflow® product, available from The MathWorks, Incorporated), software diagrams, one or more textual array-based and/or dynamically typed languages (e.g., via the MATLAB® product, available from The MathWorks, Incorporated) and/or textual array-based and/or dynamically typed language associated therewith, noncausal block diagrams (e.g., via the Simscape™ product, available from The MathWorks, Incorporated), and/or another type of model. In some implementations, a model include a time-based aspect, and may, during simulation and based on a sample time of the model (e.g., a discrete sample time, a continuous sample time, a fixed in minor step sample time, an inherited sample time, a constant sample time, a variable sample time, a triggered sample time, or an asynchronous sample time), produce an output and/or update an internal state of the model.

Physical device 230 may communicate with host device 210 and includes one or more physical devices capable of receiving, generating, storing, processing, and/or providing information, such as sensor data, control data, or the like. For example, physical device 230 may include a system and/or subsystem, such as a computing device, a mobile phone, a smart phone, a camera, a camcorder, a microphone, a video display, a robot, an unmanned aerial vehicle (UAV), an automobile, or the like. Additionally, or alternatively, physical device 230 may include another system and/or subsystem, such as a sensor, a sensor platform (e.g., a combination of multiple sensors), an actuator, a motor, an accelerometer, a gyroscope, a measurement device, an input component, an output component, a processing component, a video processor, a transmitter, or the like. In some implementations, physical device 230 may include an I/O device, an embedded processor, a field programmable gate array, a graphical processing unit, or the like. In some implementations, physical device 230 may execute program code (e.g., associated with a device driver model element) generated by host device 210. In some implementations, physical device 230 may include one or more other physical devices 230. Physical device 230 may communicate with host device 210 using wired and/or wireless connections to exchange information. Physical device 230 may be modeled using TCE 220. In some implementations, physical device 230 may be associated with a device description, such as a set of parameters associated with describing characteristics of physical device 230 (e.g., an XML document identifying I/O components of physical device 230 or a communication protocol of physical device 230).

Server device 240 includes one or more devices capable of receiving, generating, storing, processing, and/or providing a model and/or information associated with a model (e.g., information associated with a model element). For example, server device 240 may include a computing device, such as a server, a desktop computer, a laptop computer, a tablet computer, or a similar device. In some implementations, server device 240 may host TCE 220. In some implementations, host device 210 may be used to access one or more TCEs 220 running on one or more server devices 240. For example, multiple server devices 240 may be used to execute program code (e.g., serially or in parallel), and may provide respective results of executing the program code to host device 210. In some implementations, server device 240 may include multiple TCEs 220, such as via a set of virtual machines or operating system processes.

In some implementations, host device 210 and server device 240 may be owned by different entities. For example, an end user may own host device 210, and a third party may own server device 240. In some implementations, server device 240 may include a device operating in a cloud computing environment. In this way, front-end applications (e.g., a user interface) may be separated from back-end applications (e.g., program code execution).

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks. In some implementations, network 250 may include one or more heterogeneous networks, such as a set of networks including an open-public network, a private network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
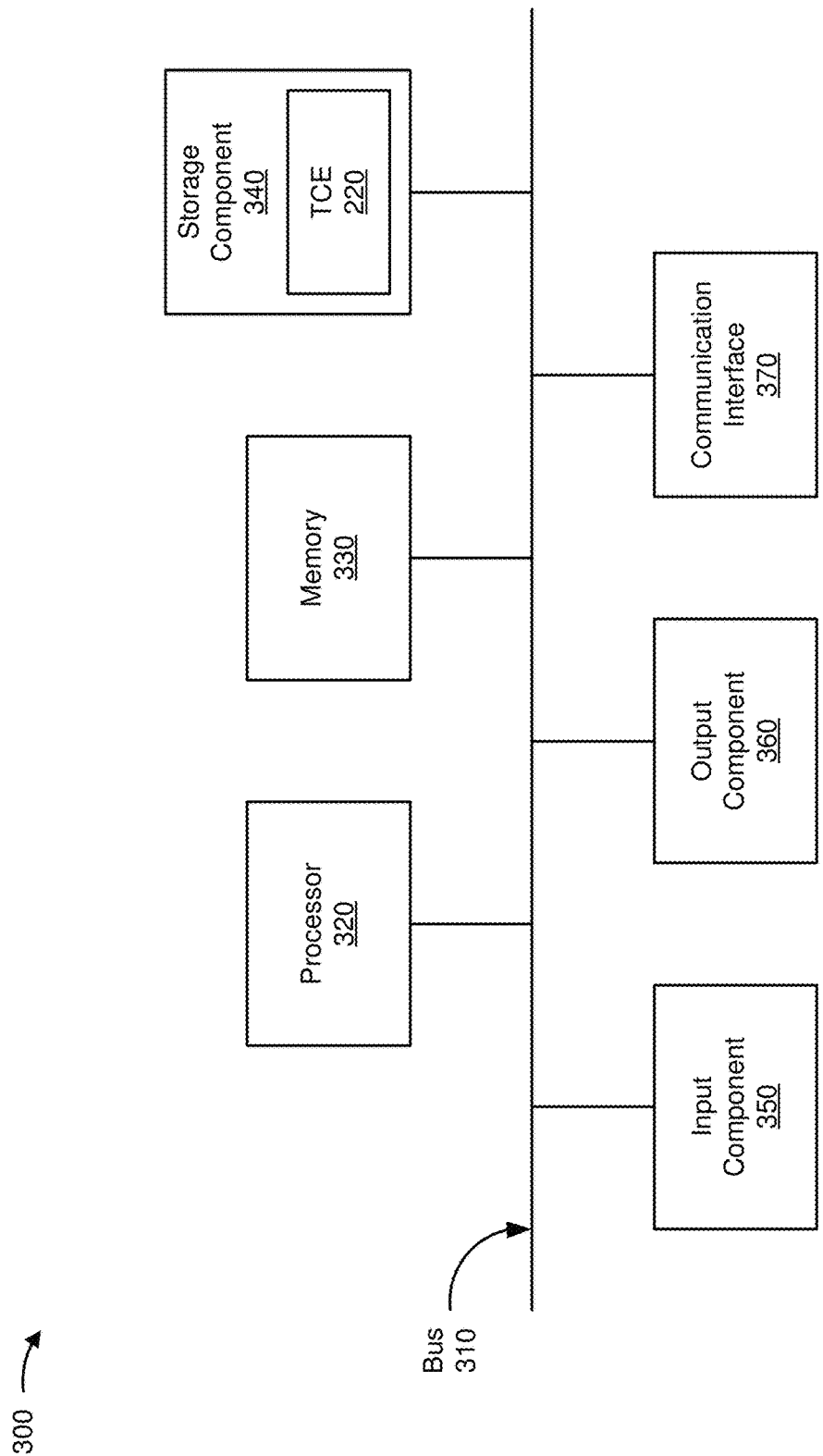
FIG. 3 is a diagram of example components of one or more devices of FIG. 2.

FIG. 3 is a diagram of example components of a device 300. Device 300 may correspond to host device 210, physical device 230, and/or server device 240. In some implementations, host device 210, physical device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. In some implementations, storage component 340 may store TCE 220.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
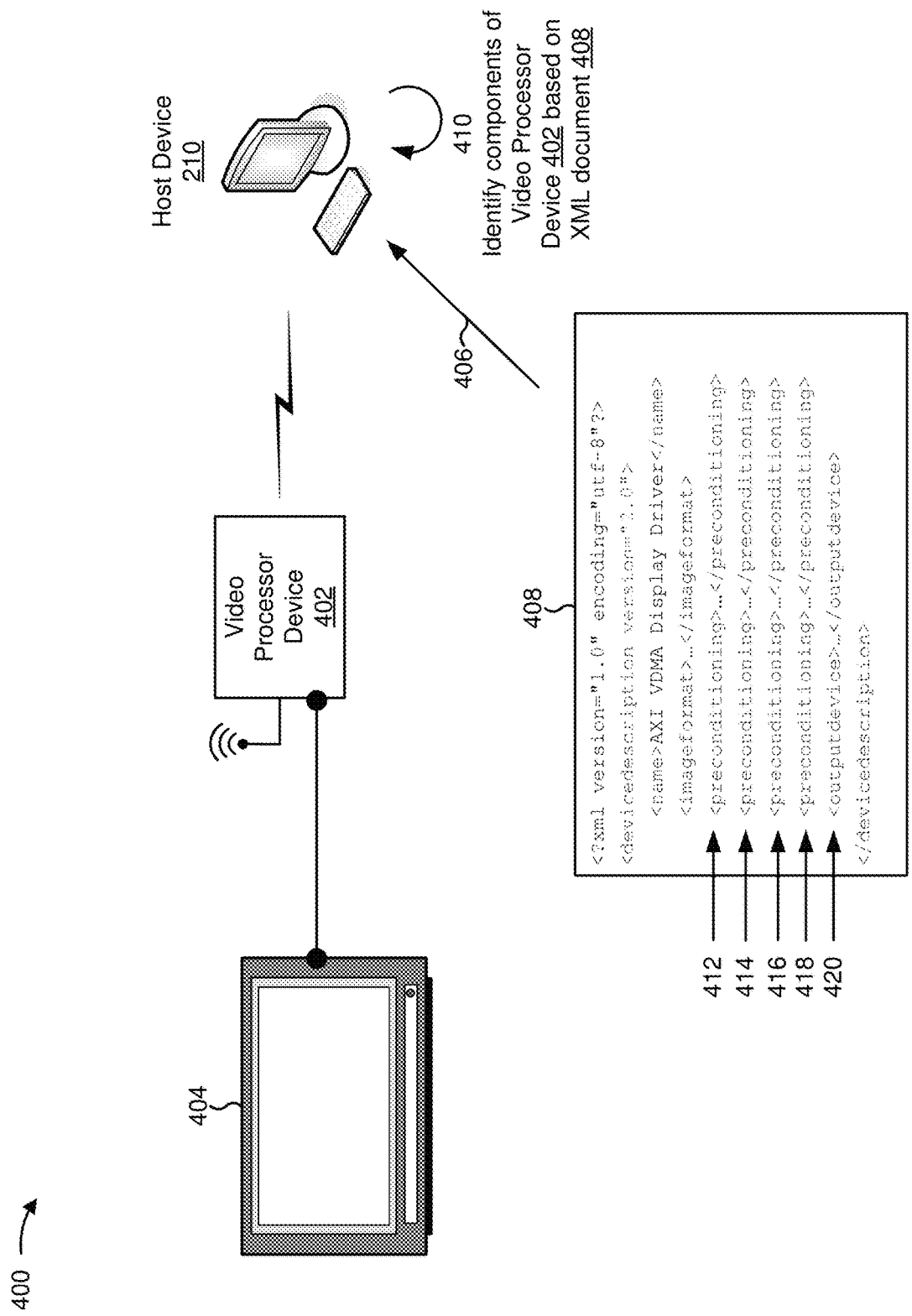
FIGS. 4A-4C are diagrams of an example of generating a device driver model element.
Figure 4B:
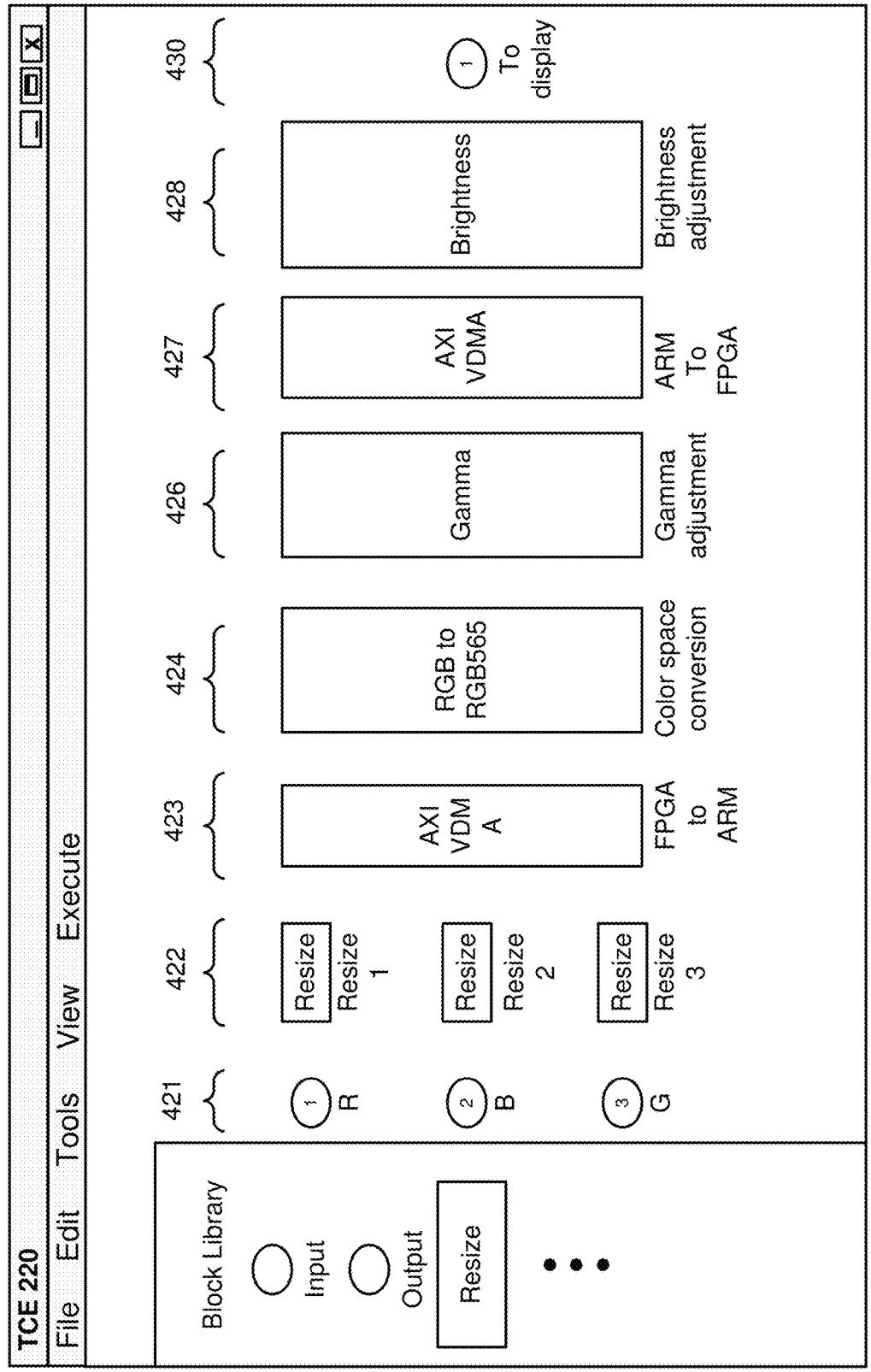
Figure 4C:
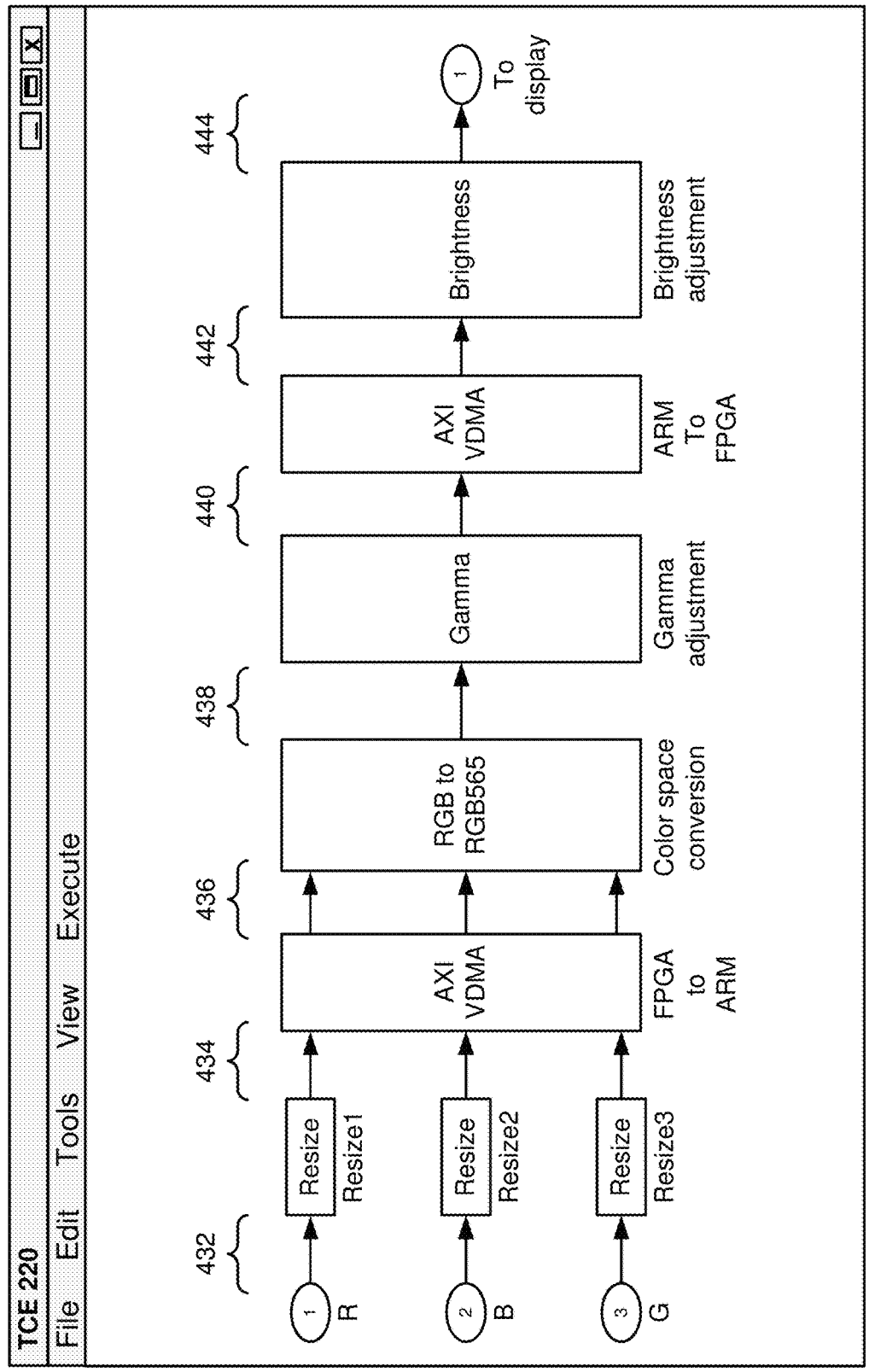

FIGS. 4A-4C are diagrams of an example implementation 400 of generating a device driver model element.

As shown in FIG. 4A, host device 210 connects to a video processor device 402 (e.g., a particular type of physical device 230) that is associated with receiving video data, processing the video data, and providing the video data (e.g., to a video card device, not shown) for display via display device 404. Assume that video processor device 402 includes a field programmable gate array (FPGA) fabric and a programmable ARM Cortex-A9 processor, such as a Zynq® device available from Xilinx, Inc., utilizing a Linux based operating system (OS). Further assume that video processor device 402 is associated with processing a frame of image data (e.g., a portion of the video data) for display optimization (e.g., a set of pre-conditioning operations, such as scaling, color space conversion, brightness adjustment, and/or gamma adjustment).

As further shown in FIG. 4A, and by reference number 406, host device 210 obtains XML document 408, which includes a device description of video processor device 402. As shown by reference number 410, host device 210 identifies components of video processor device 402 based on XML document 408. For example, host device 210 identifies a first preconditioning operation 412 (e.g., a resizing operation performed by the FPGA), a second preconditioning operation 414 (e.g., a color space conversion operation performed by the ARM processor), a third preconditioning operation 416 (e.g., a gamma adjustment operation performed by the ARM processor), a fourth preconditioning operation 418 (e.g., a brightness adjustment operation performed by the FPGA), and an output operation 420 (e.g., a transport operation). Assume that host device 210 stores, in a repository of I/O components, generic I/O components corresponding to operations 412-420. For example, at a previous time, host device 210 may have generated a gamma adjustment block for a resizing operation block for a resizing device, a color space conversion block for a color space conversion device, etc.

As shown in FIG. 4B, host device 210 automatically generates a set of blocks (e.g., model components) for a device driver model element representing operations 412-420 for video processor device 402. In another example, host device 210 may provide a drag-and-drop interface with which to permit a user to select blocks for inclusion in a device driver model element. In another example, host device 210 may provide a pop-up window with which a user may select one or more parameters (e.g., a type of block, a communication protocol, or a relationship), and host device 210 may select a generic block or create a new block based on the one or more parameters for inclusion in a device driver model element.

With regard to FIG. 4B, host device 210 automatically generates a group of blocks 421 (e.g., video data inputs representing red (R), blue (B), and green (G) components of the video data) and a group of resize blocks 422 (e.g., corresponding to first preconditioning operation 412, performed by the FPGA of video processor device 402). Based on the color space conversion operation being performed by the ARM processor rather than the FPGA (e.g., as determined with regard to XML document 408), host device 210 generates FPGA to ARM block 423 representing a transport from the FGPA to the ARM processor of video processor device 402.

As further shown in FIG. 4B, and by reference numbers 424 and 426, host device 210 automatically generates a color space conversion block 424 and a gamma adjustment block 426 corresponding, respectively, to second preconditioning operation 414 and third preconditioning operation 416. Based on the brightness adjustment operation being performed by the FPGA rather than the ARM processor, host device 210 generates ARM to FPGA block 427 representing a transport from the ARM processor to the FPGA of video processor device 402. As shown by reference number 428, host device 210 automatically generates brightness adjustment block 428 corresponding to fourth preconditioning operation 418. As shown by reference number 430, host device 210 automatically generates output block 430 representing output operation 420. In this way, host device 210 automatically generates blocks (e.g., model components) for a device driver model element based on a device description and a component framework (e.g., a block library of stored generic blocks).

As shown in FIG. 4C, host device 210 determines a set of connections for the set of blocks 421 through 430. For example, host device 210 automatically generates connections 432 through 444 to represent data transfers associated with blocks 421 through 430. In this way, host device 210 generates a device driver model element that may be executed to simulate a system (e.g., video processor device 402). In another example, host device 210 may store the device driver model element via a device driver model element library. In another example, host device 210 may detect user interactions with the user interface associated with adding model components representing additional preconditioning operations or removing model components representing preconditioning operations. In this way, a user may customize a device driver model element to include additional functionalities, fewer functionalities, different functionalities, or the like.

As indicated above, FIGS. 4A-4C are provided merely as an example. Other examples are possible and may differ from what was described with regard to FIGS. 4A-4C.

Figure 5A:
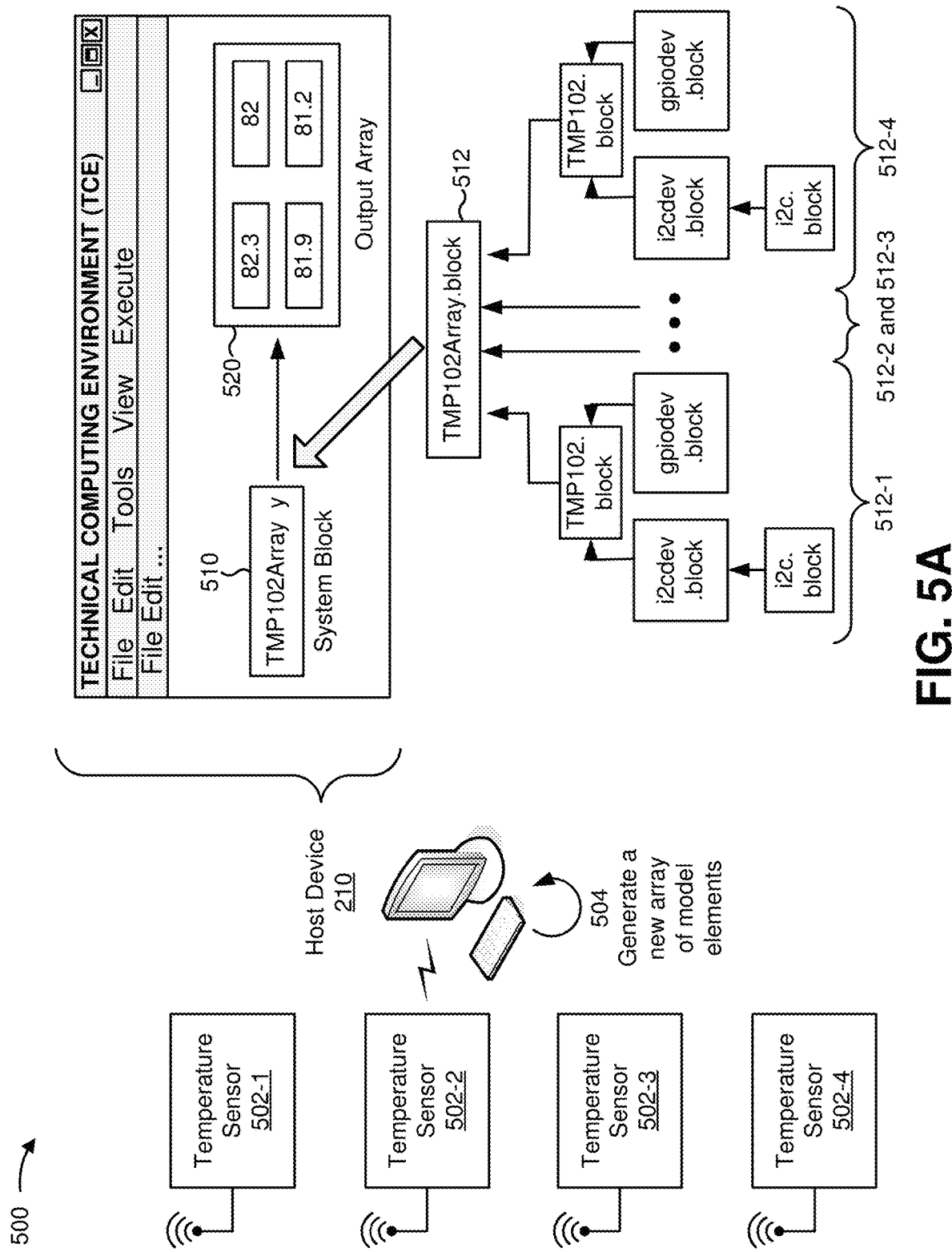
FIGS. 5A-5C are diagrams of another example of generating a device driver model element.
Figure 5B:
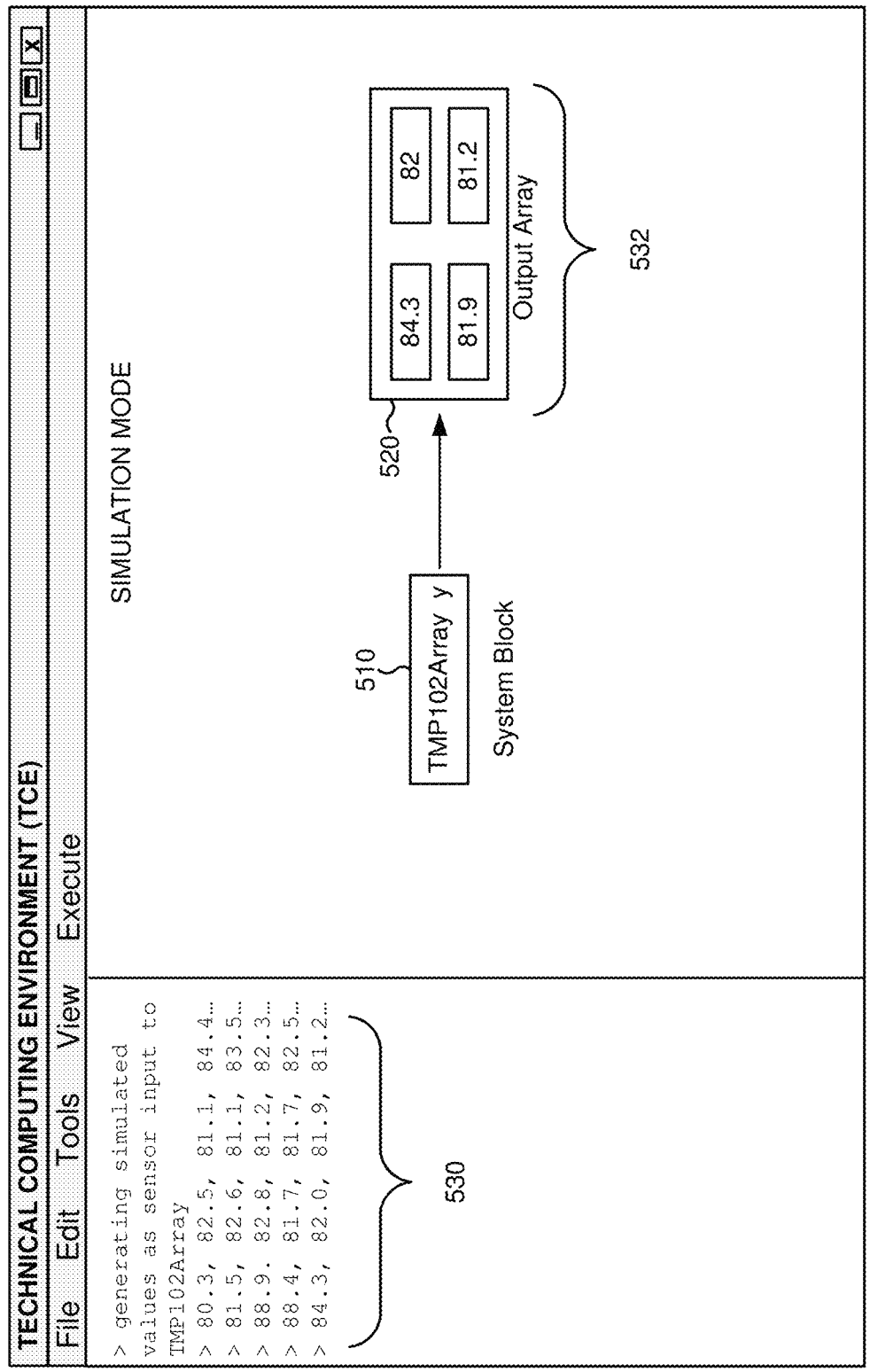
Figure 5C:
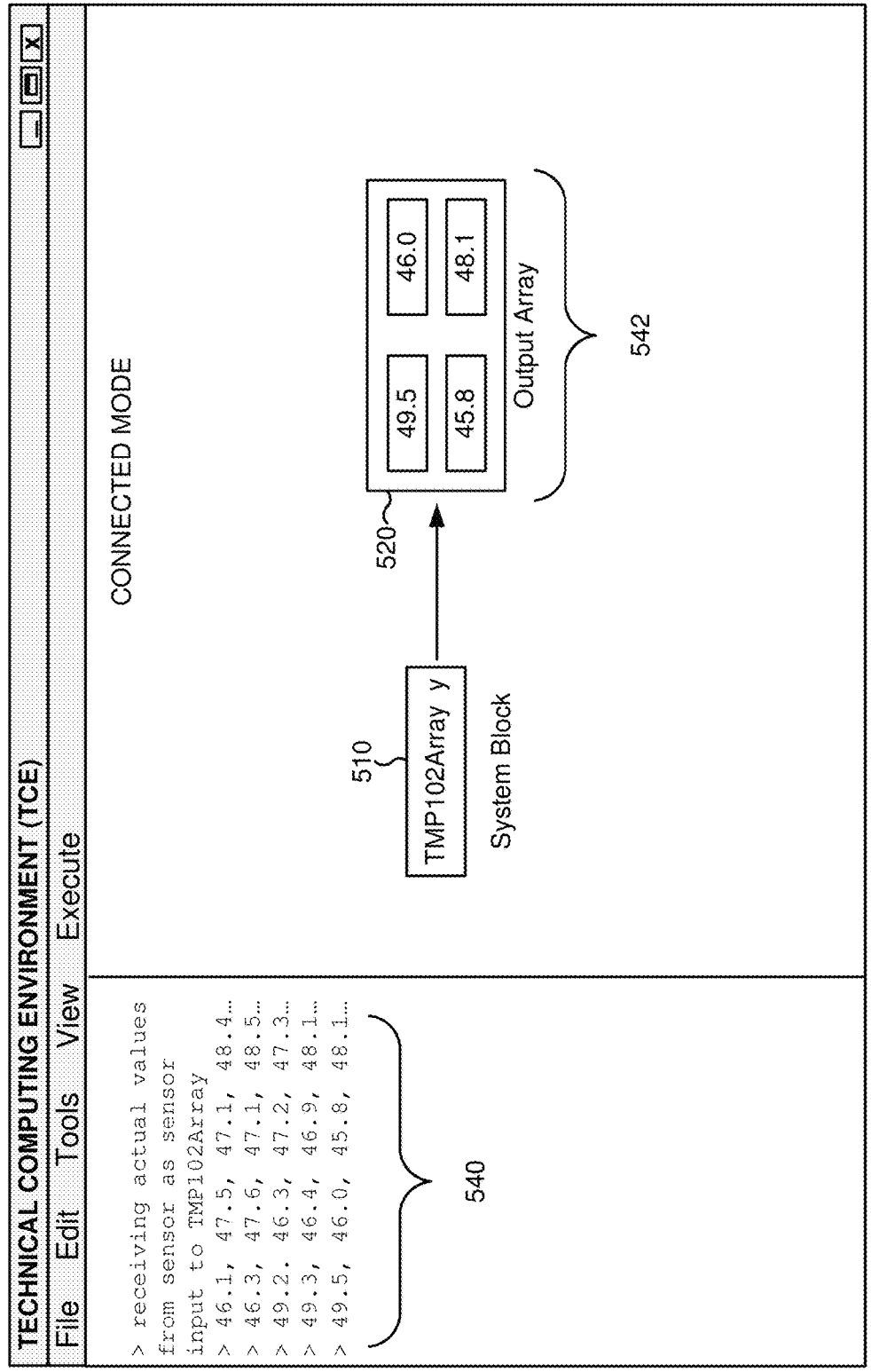

FIGS. 5A-5C are diagrams of an example implementation 500 of generating a device driver model element.

As shown in FIG. 5A, host device 210 connects to a set of temperature sensors 502-1 through 502-4 (e.g., a set of a particular type of physical device 230). In some implementations, each temperature sensor 502 may correspond to the physical device shown in FIG. 1. Collectively, the set of temperature sensors 502 represent a system (e.g., for measuring a set of temperatures at a set of locations). As shown by reference number 504, host device 210 generates a System Block model element 510 for the set of temperature sensors 502 (e.g., an array of device driver model elements corresponding to temperature sensors 502). Assume that host device 210 determines that each temperature sensor 502 is associated with an inter-integrated circuit (I2C) bus and a general-purpose I/O (GPIO) bus.

As further shown in FIG. 5A, and by reference number 512, model element 510 includes an array type of model element 512 (e.g., TMP102ARRAY.block) representing the set of temperature sensors 502. Array block 512 includes a set of model elements 512-1 through 512-4 corresponding, respectively, to temperature sensors 502-1 through 502-4. For example, model element 512-1 includes a first block (e.g., TMP102.block, a class representing temperature sensor 502-1), a second block and a third block (e.g., i2cdev.block and i2c.block, components of the class that represent the I2C bus), and a fourth block (e.g., gpiodev.block, a component of the class that represents the GPIO bus). As shown by reference number 520, model element 510 is connected to output array 520 (e.g., an output representing sensor readings obtained from the set of temperature sensors 502 utilizing model element 510). In this way, host device 210 may utilize hierarchical blocks to generate a model element that represents a hierarchical relationship (e.g., a system that includes multiple physical devices 230 (the set of temperature sensors 502)). Assume that host device 210 includes, in the device driver model element, a first one or more model components (e.g., a first subsystem) associated with operating in a simulation mode and a second one or more model components (e.g., a second subsystem) associated with operating in a connected mode.

As shown in FIG. 5B, and by reference number 530, host device 210, in the simulation mode, generates simulated values as sensor input to model element 510. As shown by reference number 532, based on generating the simulated values as sensor input to model element 510, output array 520 provides output indicating that model element 510 is correctly obtaining the sensor input and providing the sensor input as output. In this way, host device 210 utilizes a simulation mode of a device driver model element (e.g., model element 510) to simulate behavior of a physical device 230 (e.g., the set of temperature sensors 502) and/or test operation of the device driver model element.

As shown in FIG. 5C, and by reference number 540, host device 210, in the connected mode, utilizes model element 510 as a device driver to obtain actual values (e.g., sensor output) from the set of temperature sensors 502. As shown by reference number 542, host device 210 provides the output received via output array 520 for display. In this way, host device 210 utilizes a device driver model element (e.g., model element 510) to obtain data from a physical device 230 (e.g., the set of temperature sensors 502) and provide information identifying the obtained data. Host device 210 may generate program code (e.g., a device driver) representing model element 510, such as based on an automatic code generation functionality of host device 210, and may publish the program code to cause one or more other devices to connect to the set of temperature sensors 502 or a similar set of temperature sensors to obtain temperature data. For example, host device 210 may group portions of program code representing each model component of model element 510, and may publish the group of portions of program code for execution.

As indicated above, FIGS. 5A-5C are provided merely as an example. Other examples are possible and may differ from what was described with regard to FIGS. 5A-5C.

Figure 6:
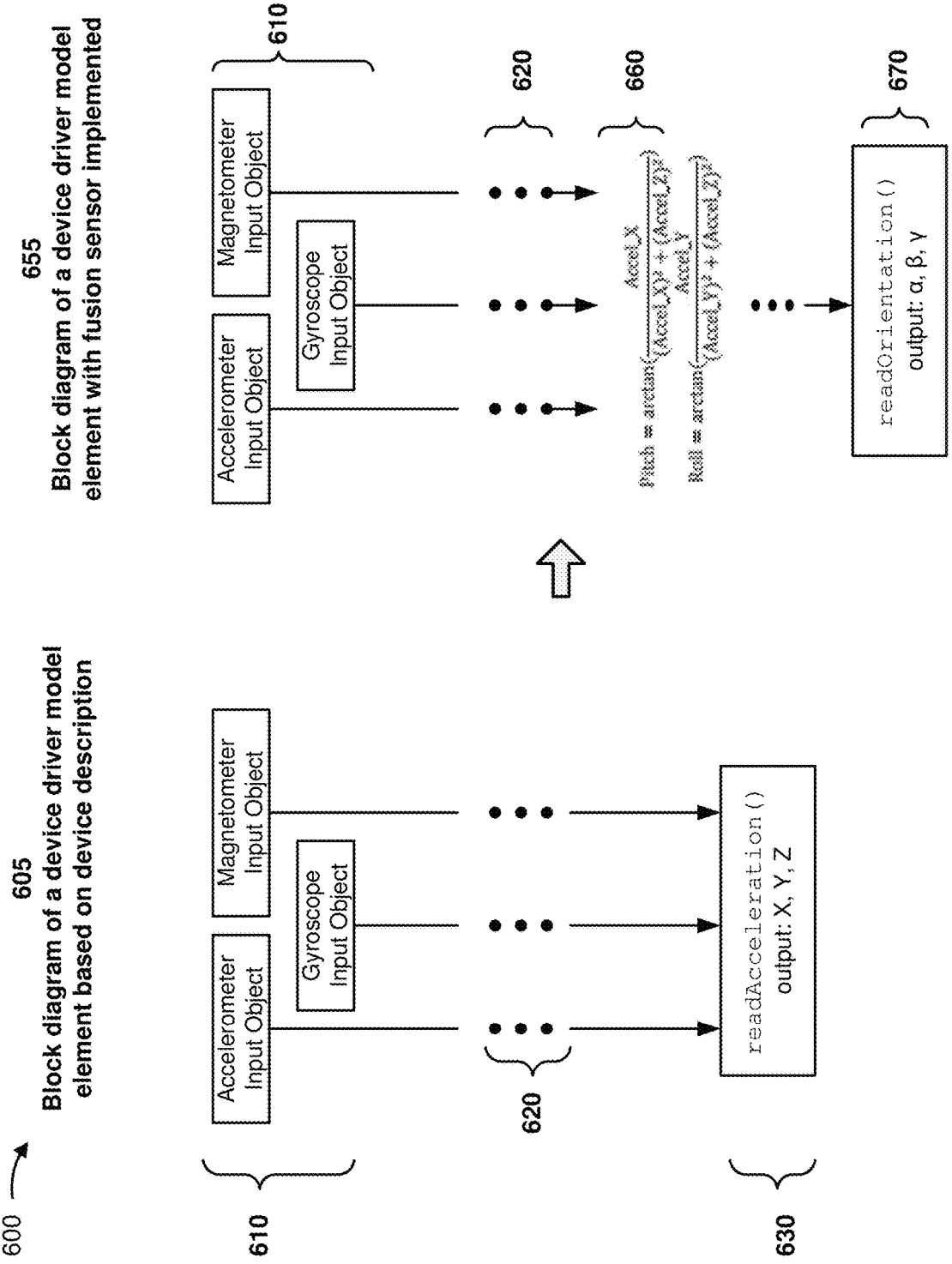
FIG. 6 is a diagram of yet another example of generating a device driver model element.

FIG. 6 is a diagram of an example implementation 600 of generating a device driver model element.

As shown in FIG. 6, a block diagram 605 represents a functional view of a device driver model element generated by host device 210 based on a device description. As shown by reference number 610, the device driver model element includes a set of input model components associated with reading sensor data as input from an accelerometer, a gyroscope, and a magnetometer associated with a sensor platform (e.g., a particular type of physical device 230). As shown by reference number 620, the device driver model element includes a set of other model components associated with processing operations 620 for the sensor data input. As shown by reference number 630, the device driver model element provides, as output for a readAcceleration( ) function call model component (e.g., a textual model component), X, Y, and Z coordinate measurements of acceleration. The coordinate measurements may be read by a particular model component using an inter-integrated circuit communication protocol or serial peripheral interface bus protocol from a 16-bit register of the sensor platform. In another example, host device 210 may include a model component associated with performing a write operation of data to alter a measurement rate of the device driver model element (in a simulation mode) or the sensor platform (in a connected mode). In this way, a model element device driver permits host device 210 (e.g., or another device) to utilize the model element device driver to obtain sensor data from the accelerometer, the gyroscope, and/or the magnetometer.

However, when constructing the device driver model element, host device 210 may include model components representing one or more processing algorithms, not specified in the device description. Assume that host device 210 determines, based on a previously defined algorithm (e.g., utilized for another physical device 230), that sensor data read from an accelerometer, gyroscope, and magnetometer of a sensor platform may, when processed, be utilized to determine an orientation of the sensor platform. As shown by reference number 655, host device 210 implements, in another block diagram of a similar device driver model element, a fusion sensor. As shown by reference number 660, a block 660 represents a sensor fusion operation (e.g., an algorithm combining data from multiple sensors) model component (e.g., a textual model component) included in the device driver model element to process sensor data obtained from input objects 610 and processing operations 620. As shown by reference number 670, the device driver model element provides, as output for a readOrientation( ) function call, α, β, γ coordinate measurements (e.g., pitch, roll, and yaw values) corresponding to an orientation of a sensor platform including the accelerometer, the gyroscope, and the magnetometer. In this way, host device 210 enhances functionality of a particular physical device 230 (e.g., by including algorithms, not specified in a device description, in a device driver model element) relative to a device driver that only provides information specified for the particular physical device 230 in a device description.

In another example, host device 210 may determine generate a model component associated with adding a functionality to a single sensor rather than multiple sensors, such as detecting a person based on image data from an image sensor and outputting information indicating the detection of the person. In another example, host device 210 may generate a model component to process raw data based on an algorithm and output a result of the algorithm.

As indicated above, FIG. 6 is provided merely as an example. Other examples are possible and may differ from what was described with regard to FIG. 6.

Figure 7:
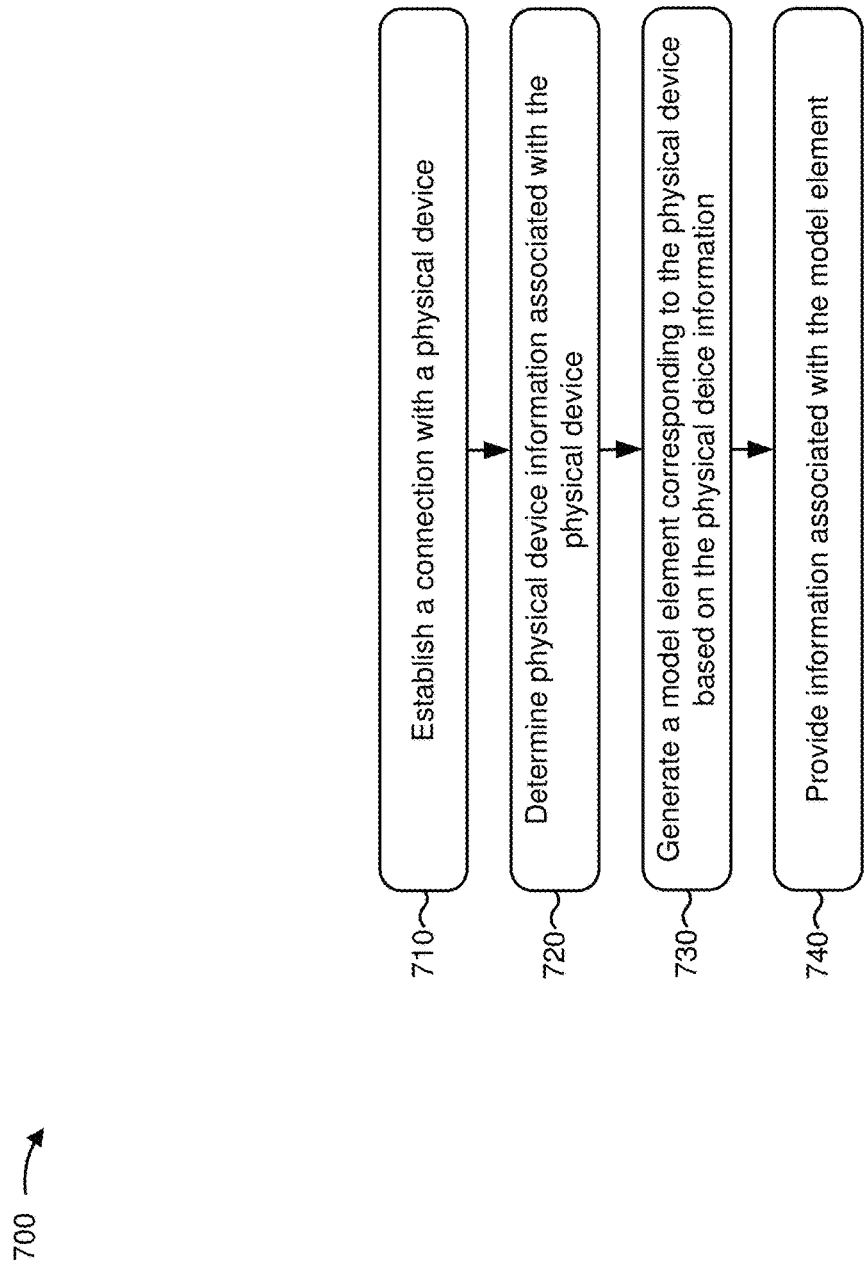
FIG. 7 is a flow chart of an example process for generating a device driver model element.

FIG. 7 is a flow chart of an example process 700 for generating a device driver model element. In some implementations, one or more process blocks of FIG. 7 may be performed by host device 210. In some implementations, one or more process blocks of FIG. 7 may be performed by another device or a group of devices separate from or including host device 210, such as physical device 230 and/or server device 240.

As shown in FIG. 7, process 700 may include establishing a connection with a physical device (block 710). For example, host device 210 may establish the connection with physical device 230. In some implementations, host device 210 may establish the connection with physical device 230 based on physical device 230 being moved within communication range or sensor range of host device 210. For example, host device 210 may detect that physical device 230 is capable of connecting to host device 210 (e.g., detect that physical device 230 includes a communication interface for a connection to host device 210 based on information being transmitted by physical device 230), and may establish the connection based on detecting that physical device 230 is capable of connecting. Additionally, or alternatively, host device 210 may establish the connection with physical device 230 based on a user indication. For example, when host device 210 provides a user interface to a particular user, the particular user may indicate to host device 210 (e.g., based on interacting with the user interface) that host device 210 is to connect to physical device 230. Additionally, or alternatively, host device 210 may detect that physical device 230 has moved within a physical space being monitored by host device 210.

In some implementations, host device 210 may generate a device driver model element for physical device 230 without establishing the connection with physical device 230, such as based on a user indication, based on receiving a request, or the like. For example, host device 210 may provide a user interface with which to create a device driver model element, and may detect a user interaction with the user interface associated with causing host device 210 to generate the device driver model element. In this case, host device 210 may alter the user interface (e.g., provide a different set of user interface elements, as described herein) to permit creation of the device driver model element. In this way, host device 210 may generate a device driver model element for physical device 230 without requiring a connection to physical device 230.

As further shown in FIG. 7, process 700 may include determining physical device information associated with the physical device (block 720). For example, host device 210 may determine the physical device information associated with physical device 230. In some implementations, host device 210 may determine physical device information identifying physical device 230. For example, host device 210 may obtain a physical device identifier (e.g., a serial number, an address, a device name, etc.), a network address associated with providing physical device information, or the like. In this case, host device 210 may utilize the physical device information identifying physical device 230 to obtain other information, such as a device description identifying I/O components, a type of processor, a type of operating system, a type of communication protocol, or the like of physical device 230. For example, host device 210 may access the network address to obtain the other information. Additionally, or alternatively, host device 210 may perform an Internet search, utilize a data mining technique of a device database, or the like to obtain the other information based on information identifying physical device 230. In some implementations, host device 210 may obtain the physical device information from physical device 230. For example, physical device 230 may transmit a physical device identifier, a device description, or the like.

Additionally or alternatively, host device 210 may receive user input indicating I/O components of physical device 230, a communication protocol used by physical device 230, an algorithm for processing data of physical device 230, or the like. For example, host device 210 may provide a set of user interface elements associated with receiving a selection of a set of I/O components (e.g., from an I/O component repository or library) that are utilized by physical device 230 (and are to be included in a device driver model element corresponding to physical device 230). In this case, host device 210 may automatically determine a portion of the device description based on receiving the user input, may suggest user input selections (e.g., suggest a particular output component corresponding to a user selection of an input component), or the like.

In some implementations, host device 210 may obtain a physical device information associated with a particular format. For example, host device 210 may obtain a device description document (e.g., an XML document, a unified modeling language (UML) document, a Joint Photographic Experts Group (JPEG) file, a Moving Picture Expert Group v. 4 (MPEG-4) file, a HyperText Markup Language (HTML) document, a dynamically typed, array based, functional language document, such as a MATLAB document, or the like, an IP-XACT IEEE 1685 file, a ISO 10303 standard for the exchange of product model data (STEP) file, or the like). In this case, host device 210 may parse the device description document using a document parser tool associated with the particular format to obtain the information identifying the I/O components of physical device 230, a communication protocol associated with physical device 230, or the like.

In some implementations, host device 210 may correlate the device description to a set of generic model components included in a generic model component library or generic model component repository. For example, host device 210 may determine that physical device 230 includes a particular type of input component (e.g., a temperature sensor), and may identify a generic model component corresponding to the particular type of input component (e.g., a model block associated with representing a numerical input via a communication protocol utilized by the temperature sensor). A generic model component may refer to a model component that utilizes a particular communication protocol common to multiple devices (e.g., physical devices 230). For example, the generic model component may utilize a low-level master-slave communication protocol, such as inter-integrated circuit communication, serial peripheral interface bus communication, serial communication, or the like. Additionally, or alternatively, the generic model component may utilize a bus transaction protocol, a particular input or output device interface common to different types of physical device 230, a sensor interface common to different types of physical device 230, or the like.

Additionally, or alternatively, host device 210 may correlate the device description to another type of component, such as an output component, a processing component, a protocol component (e.g., a communications protocol utilized by physical device 230), an operation mode component (e.g., a component associated with generating simulated values for a simulation mode of operation), or the like.

Additionally, or alternatively, host device 210 may determine that a component library does not include a generic component corresponding to the particular type of input. In this case, host device 210 may generate a new model component utilizing a model component generation tool. Additionally, or alternatively, host device 210 may request and receive a model component (e.g., from a vendor of physical device 230). In some implementations, host device 210 may provide a set of user interface elements permitting a user to create a new model component. For example, host device 210 may provide a modeling user interface with which the user can provide input, such as by providing a textual function, a graphical function, a textual block, a graphical block, or the like that corresponds to a component of physical device 230. In this way, host device 210 identifies components that are to be included in a device driver model element using a library of generic components, a model environment, or the like. Based on utilizing a library of generic components, host device 210 reduces a processing requirement relative to requiring manual generation of a device driver via a program code environment. Moreover, based on providing a model environment for manual generation of a portion of a device driver model element, host device 210 reduces a difficulty in creating the device driver model element relative to a program code environment, thereby reducing time required and processing resources expended.

In some implementations, host device 210 may identify a set of algorithmic components of physical device 230 that are to be included in the device driver model element. For example, when physical device 230 is associated with a preconditioning step, as described herein with regard to FIGS. 4A-4C, physical device 230 may identify a generic algorithmic model component corresponding to the preconditioning step, a textual algorithm corresponding to the preconditioning step, or the like.

In some implementations, host device 210 may correlate the device description to a set of connections associated with the set of components. For example, host device 210 may determine that a first block of a device driver model element is to connect to a second block of the device driver model element based on the device description indicating that a first component of physical device 230 (e.g., an input component) connects to a second component of physical device 230 (e.g., a processor component).

As further shown in FIG. 7, process 700 may include generating a model element corresponding to the physical device based on the physical device information (block 730). For example, host device 210 may generate the model element (e.g., a device driver model element) corresponding to physical device 230 based on the physical device information. In some implementations, host device 210 may generate a graphical device driver model element corresponding to physical device 230. For example, host device 210 may generate the set of generic graphical model components (e.g., I/O blocks, protocol blocks, processing blocks, or display blocks) corresponding to components of physical device 230 based on the physical device information. Additionally, or alternatively, host device 210 may generate a textual device driver model element including a set of generic textual model components (e.g., a set of textual blocks, function blocks, algorithms, or the like corresponding to components of physical device 230). Additionally, or alternatively, host device 210 may generate a device driver model element including a combination of textual model components and graphical model components.

In some implementations, host device 210 may generate a set of connections for the device driver model element. For example, based on the physical device information, host device 210 may generate a set of graphical connectors associated with model components of the device driver model element. Additionally, or alternatively, host device 210 may generate a set of textual connectors associated with model components of the device driver model element. In this way, host device 210 represents one or more data transfers associated with the device driver model element.

In some implementations, host device 210 may generate a set of model components associated with a hierarchical relationship. For example, host device 210 may generate a function, a block, or the like that is associated with another function, another block, or the like via a hierarchical relationship. In this way, host device 210 represents hierarchical relationships of one or more physical devices 230 and/or one or more portions of a particular physical device 230 via a device driver model element.

In some implementations, host device 210 may provide a user interface associated with permitting a user to select and position one or more model components for the device driver model element. For example, host device 210 may include a user interface element associated with identifying available model components for inclusion in the device driver model element, and may detect an interaction with the user interface element associated with selecting a particular model component for inclusion as a block of the device driver model element, such as a click-and-drag interaction, a selection interaction, a voice interaction, or the like. In this way, host device 210 permits a user to customize a device driver model element, such as when a device description fails to identify a portion of physical device 230 for automatic modeling by host device 210.

In some implementations, host device 210 may generate an algorithm not included in the physical device information, and may include a model component representing the algorithm in the device driver model element. For example, host device 210 may determine that sensor data from an accelerometer, an airbag deployment sensor, and an atmospheric sensor may be combined, based on an algorithm, to determine whether an automobile has been in an accident. In this case, host device 210 may generate a block (e.g., for a device driver model element corresponding to a car computer physical device 230) associated with receiving the sensor data, processing the sensor data, and generating a Boolean output indicating whether the automobile has been in an accident. Similarly, host device 210 may determine that data from a set of multiple accelerometers and a timer may be utilized, with an initial position, to determine a position at another period of time (e.g., subsequent to an initial time when a physical device 230 is located at the initial position). In this case, host device 210 may generate a block to combine the data and generate a position output. In this way, host device 210 enhances functionality of physical device 230 relative to utilizing only algorithms native to physical device 230 for the device driver model element.

In some implementations, host device 210 may generate one or more model components associated with one or more operation modes of the device driver model element. For example, host device 210 may generate a model component associated with a simulation mode (e.g., providing simulated values as an input to the device driver model element representing a simulation of operation of physical device 230), a connected mode (e.g., connecting the device driver model element to receive actual values from physical device 230), or the like. In this way, host device 210 permits the device driver model element to be utilized as an interface for connecting to physical device 230 and/or one or more other physical devices 230 of the same type.

As further shown in FIG. 7, process 700 may include providing information associated with the model element (block 740). For example, host device 210 may provide information associated with the model element (e.g., the device driver model element). In some implementations, host device 210 may provide the model element for display. For example, host device 210 may cause blocks of the device driver model element to be displayed via a user interface (e.g., of TCE 220).

In some implementations, host device 210 may cause multiple views of the device driver model element to be provided for display. For example, when the device driver model element includes multiple model components associated with a hierarchical relationship, host device 210 may provide a first hierarchical view of the device driver model element and a second hierarchical view of the device driver model element to illustrate the hierarchical relationship. Additionally, or alternatively, host device 210 may consolidate portions of the device driver model element to provide a simplified view of the device driver model element, such as by abstracting data transformations, algorithms, or the like. In some implementations, host device 210 may provide metadata associated with one or more model components of the model element. For example, host device 210 may generate and provide a set of labels associated with describing a type of model component utilized for the model element. Additionally, or alternatively, host device 210 may provide a first view of the device driver model element for display in a textual modeling environment and a second view of the device driver model element for display in a graphical modeling environment.

In some implementations, host device 210 may provide information associated with utilizing the device driver model element. For example, host device 210 may detect a user interaction with a user interface associated with causing host device 210 to provide a simulation mode of the device driver model element. In this case, host device 210 may generate simulated values for physical device 230 as input to the device driver model element, which may be utilized to test functionality of the device driver model element. Additionally, or alternatively, host device 210 may operate a connected mode that utilizes the device driver model element to receive data from physical device 230 and/or write data to physical device 230. In this case, host device 210 may provide, via a user interface, information identifying a state of physical device 230 and/or the model element when operating in the connected mode.

In some implementations, host device 210 may provide program code representing the device driver model element. For example, host device 210 may utilize a code generation tool to automatically generate a device driver for execution (e.g., via host device 210, physical device 230, or another device) based on the device driver model element. In this case, host device 210 may generate one or more functions, variables, or the like to permit another device (e.g., another host device 210 or the like) to execute the device driver to connect to physical device 230, read/write data associated with physical device 230, or the like. In this way, host device 210 generates a device driver for a particular physical device 230 for which a device driver does not exist. In some implementations, host device 210 may generate the device driver for a particular environment. For example, host device 210 may obtain a selection of a particular framework, such as an OS framework, a non-OS (bare-metal) framework, or the like, and may utilize the particular framework to generate the device driver for a particular environment corresponding to the particular framework. In some implementations, host device 210 may generate the device driver to utilize a particular type of stack. For example, host device 210 may generate a protocol stack-based device driver, a non-protocol stack-based driver, or the like. Additionally, or alternatively, host device 210 may generate an asynchronous driver, a synchronous driver, or the like.

In some implementations, host device 210 may store a portion of the model element via a data structure. For example, when host device 210 generates one or more model components and/or receives input associated with generating the one or more model components, host device 210 may store the one or more model components via a library or repository. In this case, host device 210 may provide the one or more model components for utilization in generating another device driver model element for another physical device 230.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, host device 210 generates a device driver model element for physical device 230, thereby permitting communication with and/or simulation of physical device 230. Moreover, based on utilizing components stored in a library or repository to generate the device driver (e.g., generic components selected and connected based on a device description to create a custom device driver), host device 210 reduces a processing requirement relative to generating the device driver without utilizing stored generic components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, graphical processing unit (GPU) code, such as Open Computing Language (OpenCL) code or CUDA code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
    determining, by a first device, physical device information identifying a second device;
    selecting, by the first device, two or more generic model components, of a component library of generic model components, based on the physical device information, the component library of generic model components corresponding to components of a set of physical devices, the component library of generic model components including one or more graphical model components and one or more textual model components, and the two or more generic model components including a graphical model component of the one or more graphical model components and a textual model component of the one or more textual model components; and generating, by the first device, a device driver model element that includes the two or more generic model components based on selecting the two or more generic model components, the device driver model element being operable in at least two operation modes including at least one of:

a simulation mode in which simulated values are generated for use as one or more inputs to a model element, of at least a part of the second device, that simulates a behavior of the second device or a behavior of the at least the part of the second device, or a connected mode in which obtained data is communicated from the second device to the first device through the device driver model element.

2. The method of claim 1, where generating the device driver model element comprises:

generating a first model component of the two or more generic model components; and generating a second model component, of the two or more generic model components, such that the second model component and the first model component are associated with a hierarchical relationship.

3. The method of claim 1, further comprising:

identifying an algorithm based on the physical device information, the algorithm being implemented by the second device; and where selecting the two or more generic model components comprises:

selecting a particular generic model component corresponding to the algorithm.

4. The method of claim 1, where selecting the two or more generic model components comprises:

selecting a particular generic model component to perform a processing operation relating to data associated with the second device.

5. The method of claim 1, where selecting the two or more generic model components comprises:

selecting a particular generic model component to perform a processing operation relating to data of multiple data sources associated with the second device.

6. The method of claim 5, where the multiple data sources are multiple sensors of the second device.

7. The method of claim 1, further comprising:

generating, in the simulation mode, the simulated values;

causing, in the simulation mode, the simulated values to be utilized by the device driver model element; and providing, in the simulation mode, information associated with the device driver model element based on causing the simulated values to be utilized by the device driver model element.

8. The method of claim 1, further comprising:

connecting, in the connected mode, the second device with the device driver model element, the device driver model element performing a read operation of the obtained data from the second device; and providing, in the connected mode, information associated with the device driver model element based on causing the second device to connect with the device driver model element.

9. The method of claim 1, further comprising:

automatically generating program code for a device driver corresponding to the device driver model element; and providing the device driver.

10. The method of claim 9, where providing the device driver comprises:

providing the device driver for execution via at least one of:

an embedded processor connected to the second device, a field programmable gate array connected to the second device, or a graphical programming unit connected to the second device.

11. The method of claim 1, where the first device includes at least one of:

a host computer operating a modeling environment, a mobile device operating a modeling environment, or a server operating a modeling environment.

12. The method of claim 1, where the second device includes at least one of:

an input/output device, an embedded processor, a field programmable gate array, or a graphical processing unit.

13. A non-transitory computer-readable medium storing instructions, the instructions comprising:

one or more instructions that, when executed by one or more processors, cause the one or more processors to:

identify information identifying a physical device, the information identifying the physical device including information identifying one or more input/output (IO) components of the physical device; and automatically generate a device driver model element corresponding to the physical device based on the information identifying the physical device, the device driver model element including one or more generic graphical model components corresponding to the one or more I/O components, the device driver model element including a particular model component associated with facilitating simulation of operation of the physical device via execution of the device driver model element, and the device driver model element being operable in at least two operation modes including at least one of:

a simulation mode in which simulated values are generated for use as one or more inputs to a model element, of at least a part of the physical device, that simulates a behavior of the physical device or a behavior of the at least the part of the physical device, or a connected mode in which obtained data is communicated from the physical device to the one or more processors through the device driver model element.

14. The non-transitory computer-readable medium of claim 13, where the one or more instructions, that cause the one or more processors to automatically generate the device driver model element, cause the one or more processors to:

select a textual model component from a library of textual model components; and include the textual model component in the device driver model element.

15. The non-transitory computer-readable medium of claim 13, where the one or more instructions, when executed by the one or more processors, further cause the one or more processors to:

generate a device driver based on the device driver model element.

16. The non-transitory computer-readable medium of claim 15, where the device driver is associated with operation in an operating system (OS) environment or a bare-metal environment.

17. The non-transitory computer-readable medium of claim 15, where the device driver is an asynchronous driver or synchronous driver.

18. The non-transitory computer-readable medium of claim 15, where the device driver is a protocol stack-based driver.

19. The non-transitory computer-readable medium of claim 13, where the one or more instructions further cause the one or more processors to:

generate another model component associated with facilitating connecting to the physical device; and execute the device driver model element to connect to the physical device, connecting to the physical device including at least one of a read operation of the obtained data from the physical device.

20. A device, comprising:

a memory; and one or more processors to:

connect to a physical device;

obtain a device description document relating to the physical device based on connecting to the physical device;

parse the device description document to identify one or more components of the physical device;

select, from a repository of generic textual model components, one or more generic textual model components corresponding to the physical device based on parsing the device description document; and generate, based on selecting the one or more generic textual model components, a device driver model element that includes the one or more generic textual model components, the device driver model element being operable in at least two operation modes including at least one of:

a simulation mode in which simulated values are generated for use as one or more inputs to a model element that simulates a behavior of the physical device or a behavior of at least a part of the physical device, or a connected mode in which obtained data is communicated from the physical device to the device through the device driver model element.

21. The device of claim 20, where the one or more processors, when parsing the device description document, are to:

identify a first component, of the one or more components of the physical device, hierarchically related to a second component of the one or more components of the physical device; and where the one or more processors, when generating the device driver model element, are to:

connect a first generic textual model component, of the one or more generic textual model components, to a second generic textual model component in a hierarchical relationship, the first generic textual model component corresponding to the first component and the second generic textual model component corresponding to the second component.

22. The device of claim 20, where the one or more processors are further to:

generate program code based on the device driver model element that, when executed, permits another device to connect to the physical device or simulate functionality of the physical device.

23. The device of claim 20, where the one or more processors are further to:

determine that a particular component of the one or more components of the physical device does not correspond to a generic textual model component of the repository of generic textual model components;

provide, via a user interface, a user interface element to receive user interaction related to specifying a model component corresponding to the particular component; and receive, via the user interface, the user interaction related to specifying the model component; and where the one or more processors, when generating the device driver model element, are to:

include the model component in the device driver model element.

24. The device of claim 20, where the device driver model element includes one or more graphical model components representing a component of the physical device of the one or more components of the physical device.

25. The device of claim 20, where the one or more processors are further to:

store the device driver model element via a device driver model element repository for utilization with another physical device.

* * * * *

UNITED STATES PATENT AND TRADEMARK OFFICE
CERTIFICATE OF CORRECTION

| | | |
|---|---|---|
| PATENT NO. | : 10,884,712 B1 | Page 1 of 1 |
| APPLICATION NO. | : 15/058876 | |
| DATED | : January 5, 2021 | |
| INVENTOR(S) | : David H. Koh et al. | |

It is certified that error appears in the above-identified patent and that said Letters Patent is hereby corrected as shown below:

In the Claims

Column 20, Line 39, Claim 13:
"input/output (IO) components of the physical"
Should read:
--input/output (I/O) components of the physical--

Signed and Sealed this
Twenty-fourth Day of June, 2025

Coke Morgan Stewart
*Acting Director of the United States Patent and Trademark Office*